Jan. 26, 1971    J. RECH    3,557,522
PARTS HANDLING APPARATUS

Filed July 9, 1969    5 Sheets-Sheet 1

INVENTOR.
JAKOB RECH.
BY
*Wallace P. Lund*
ATTORNEY.

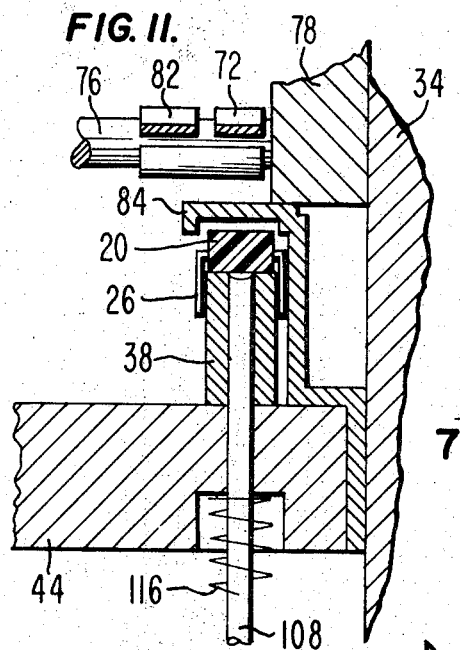
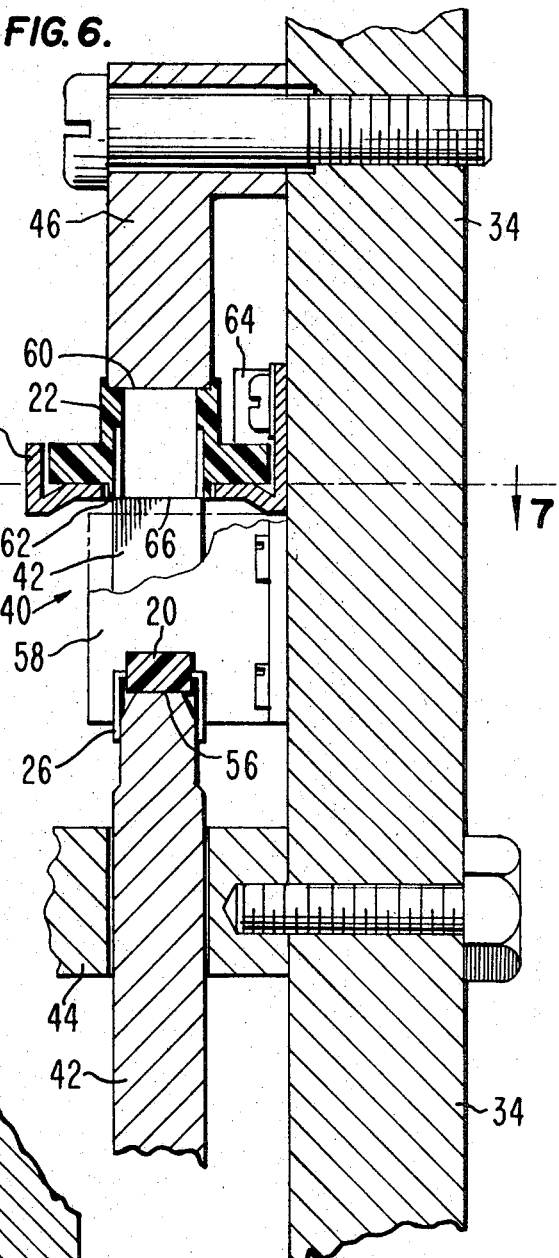
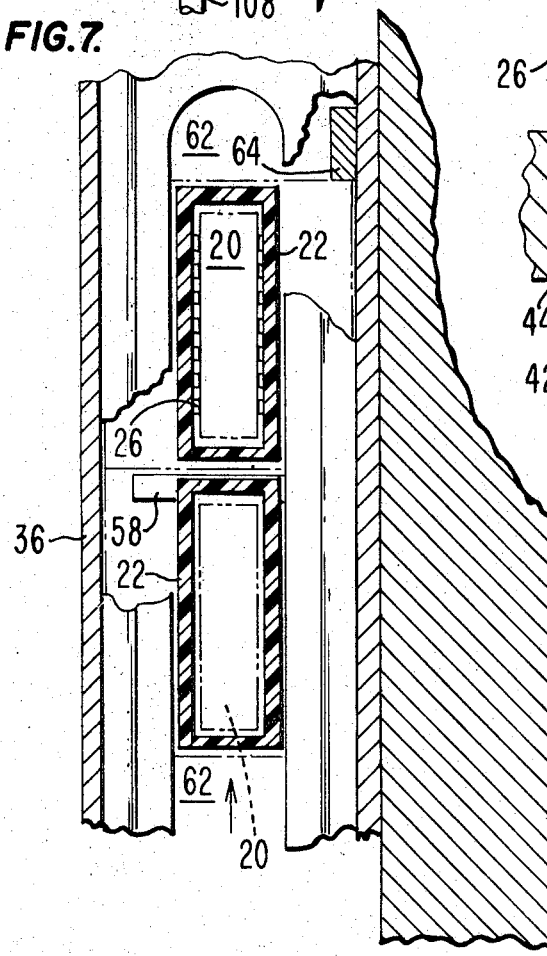
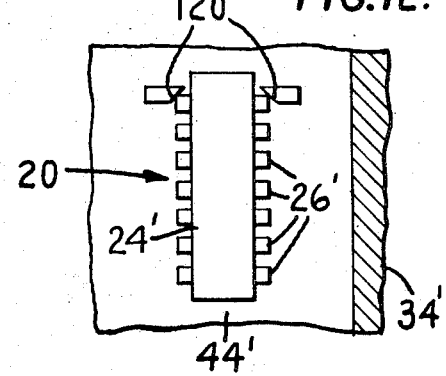

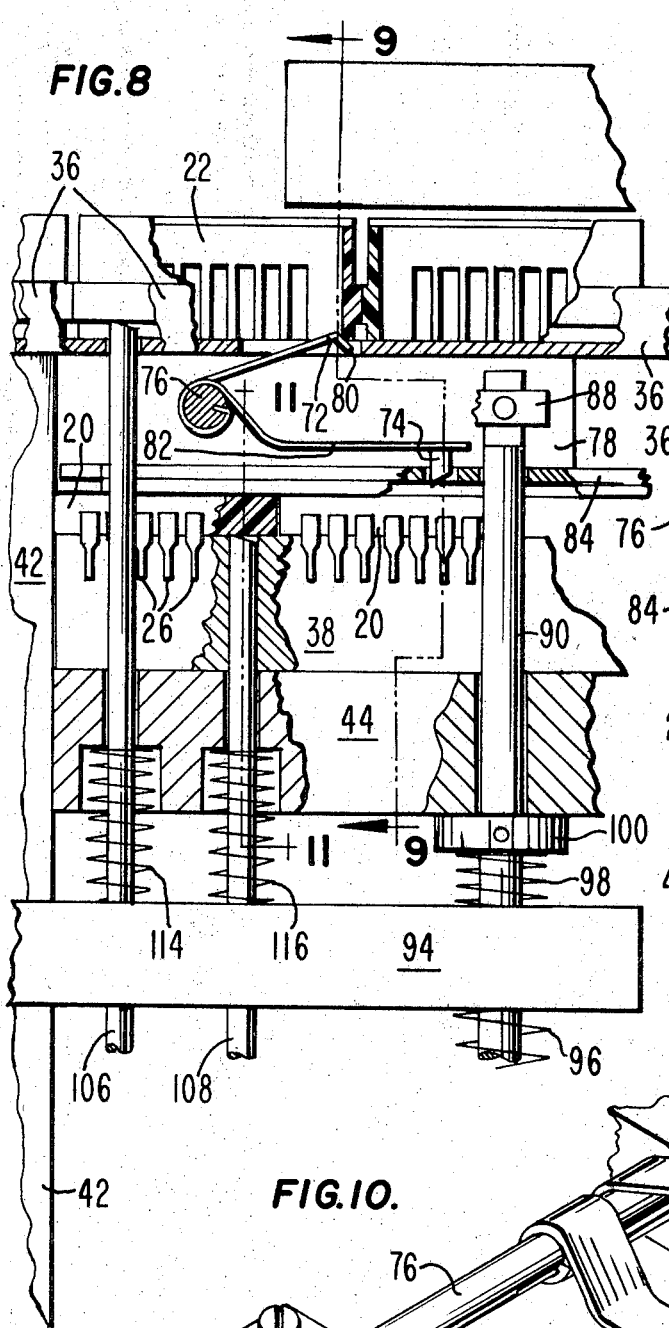
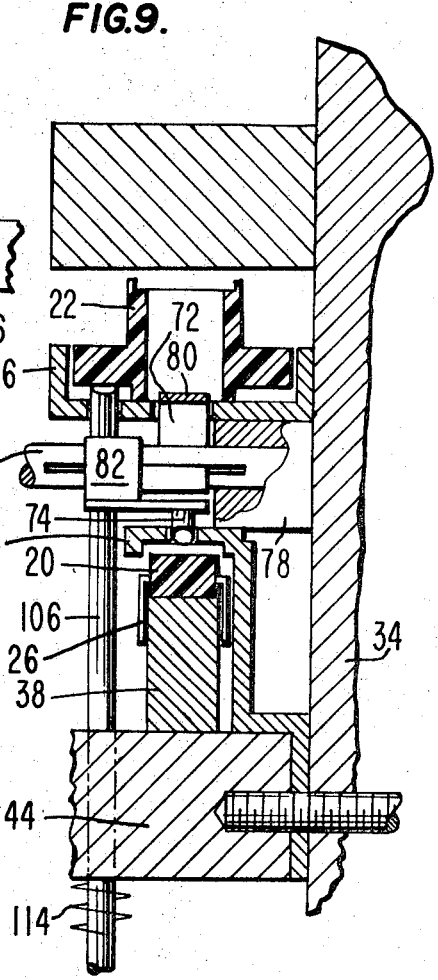
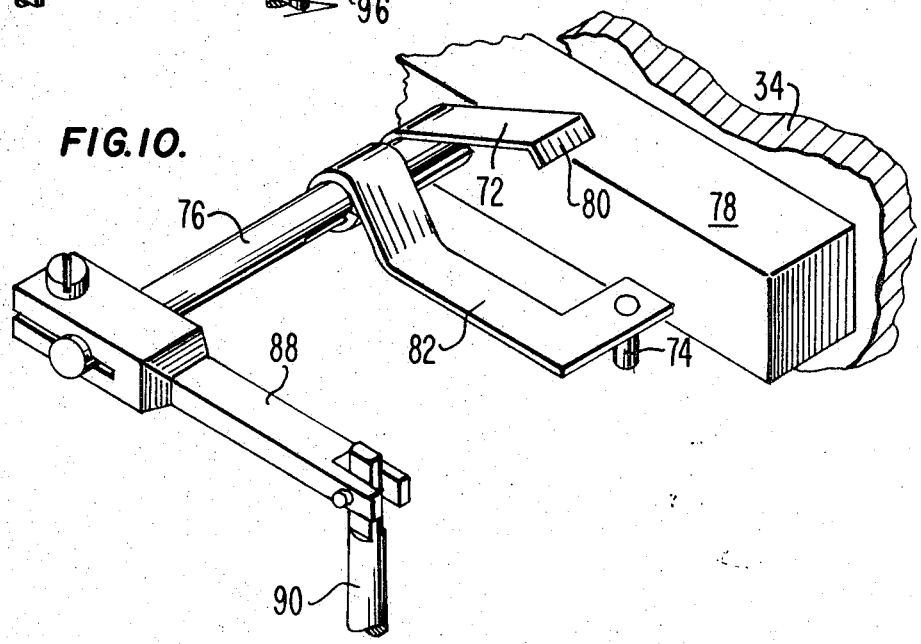

United States Patent Office 3,557,522
Patented Jan. 26, 1971

3,557,522
PARTS HANDLING APPARATUS
Jakob Rech, Detroit, Mich., assignors to Burroughs Corporation, Detroit, Mich., a corporation of Michigan
Filed July 9, 1969, Ser. No. 840,256
Int. Cl. B65b 57/08, 57/16, 5/04
U.S. Cl. 53—57      9 Claims

ABSTRACT OF THE DISCLOSURE

An apparatus for automatically handling and inserting integrated circuit units respectively into individual protective containers. An upper inclined slide for a stack of containers and a lower inclined slide for a stack of integrated circuit units lead downwardly to a station where a reciprocal pusher inserts the units respectively into the containers. The assembled units, under control of the pusher move out of the insertion station by the weight of the stack of containers and are ejected from the container slide by the pusher. Restrainers operating with the pusher alternately remove the weights of the stacks of containers and circuit units on the container and unit at the insertion station. Switches control operation of the pusher in response to predetermined depletion of the stacks of units and containers on the slideways.

SUMMARY OF THE INVENTION

The invention resides in the relationship of the pusher to the slides to control descent of the parts, in the provision of the weight restrainers to avoid dislodgement and resultant jamming of parts at the insertion station and in the provision of the control switches.

It is the principal object of the invention to provide an apparatus wherein a stack of circuit units and a stack of protective containers, may be fed by gravity down inclined slideways to a station where a pusher inserts the lowermost one of the units into a container, and to provide for relieving the weight of the stack on the lowermost unit during the insertion operation so as to assure a proper insertion operation.

In connection with the above object it is a specific object of the invention to operate the load restrainer by the pusher and in a manner to effect a delayed action of the restrainer so as to insure that the unit under insertion is clear of the stack before the restrainer is released to allow the stack to move down.

A further object of the invention resides in the provision of switches operable to stop operation of the pusher to avoid jams at the inserter station in the event that either one of the stacks of units and containers should become depleted.

IN THE DRAWINGS

FIG. 6 is a sectional view, taken along the line 6—6 of FIG. 3;

FIG. 7 is a sectional view, taken along the line 7—7 of FIG. 6;

FIG. 8 is an enlarged fragmentary side view;

FIG. 9 is a sectional view, taken along the line 9—9 of FIG. 8;

FIG. 10 is a detail perspective view;

FIG. 11 is a sectional view, taken along the line 11—11 of FIG. 8; and

FIG. 12 is a fragmentary plan view, partly in section of a modification.

Figures 1, 2:
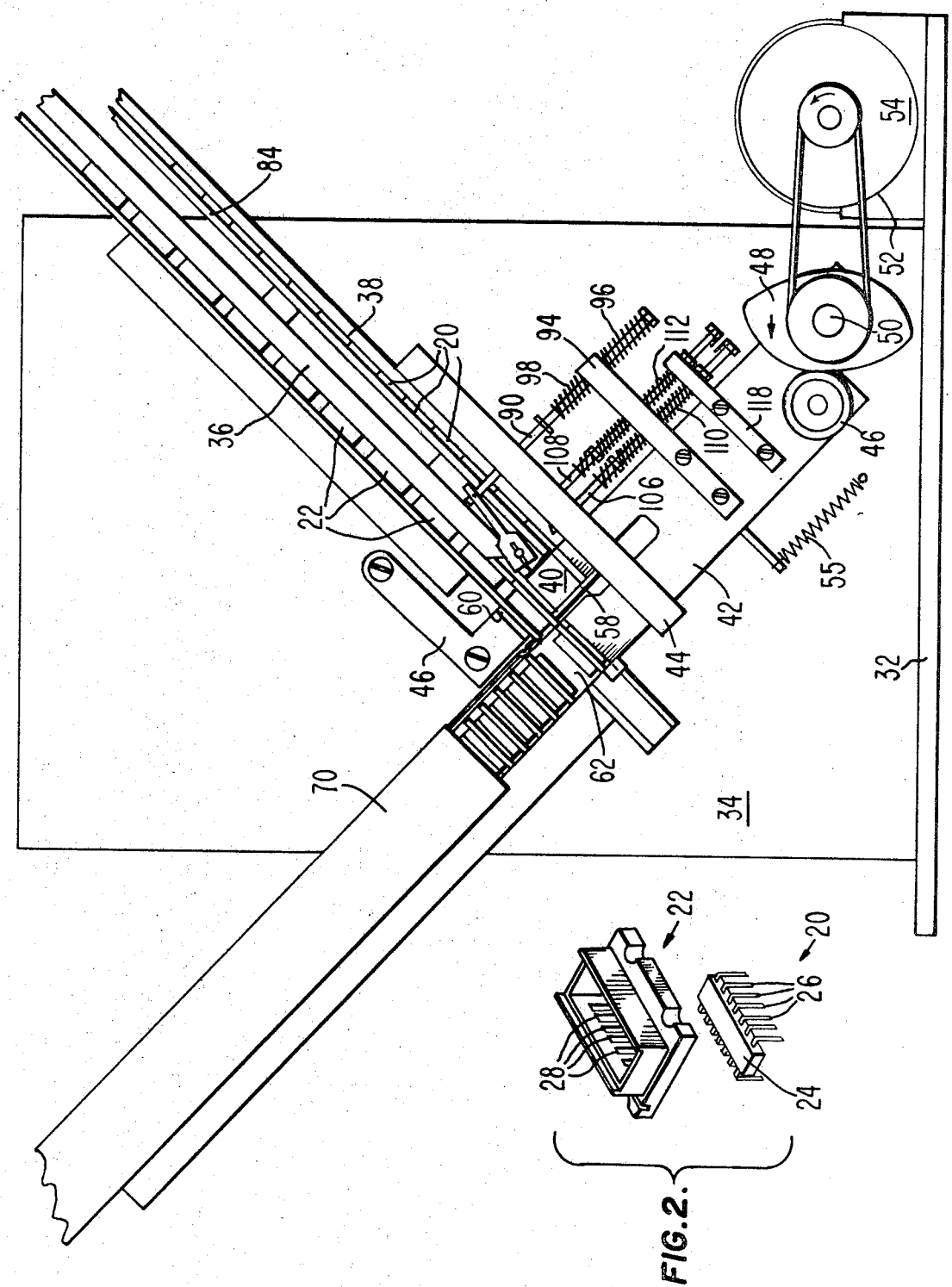
FIG. 1 is a side view of a parts handling apparatus embodying features of the invention.
FIG. 2 is an exploded perspective view of the parts to be handled by the apparatus.
Figure 5:
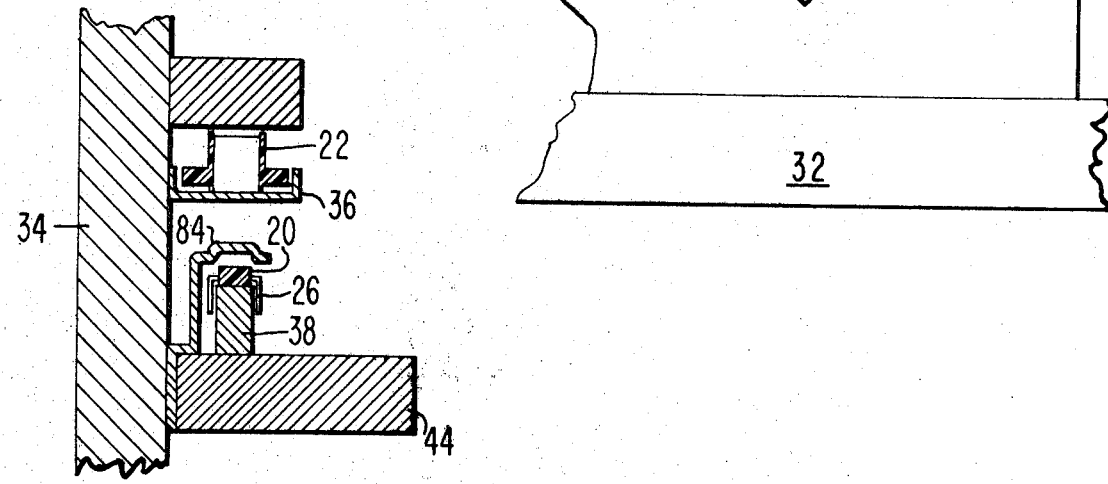
FIG. 5 is a sectional view, taken along the line 5—5 of FIG. 4.

Referring first to FIG. 2, there is shown an integrated circuit unit 20 and a protective container 22 therefor. The circuitry of the unit 20 is within an insulating body 24 of rectangular configuration and along its opposite side edges are leads 26 which require protection of the container 22 against being bent in the handling of such units. The container 22 has opposite side and opposite end walls to receive the unit 20, the side wall having recesses 28 to receive the leads 26. The units 20 can be inserted in the container 22 by pushing it upward therein, as viewed in FIG. 5, the leads 26 engaging in the recesses 28. The bends of the leads 26 abut the ends of the recesses and locate the unit within the container, the fit between the leads and the recesses 28 being a snug fit to hold the parts against accidental separation. A flange 30 extends around and is formed integral with the container.

The parts handling apparatus comprises, in general, a base 32 having an upright mounting or plate 34, a pair of slideways or tracks 36 and 38, an insertion station 40 and a pusher 42. The slideways 36 and 38, the insertion station 40 and the pusher 42 are all mounted on the upright plate 34. As shown, the slideways 36 and 38 are inclined at about 45° and extend down to the insertion station 40 where the pusher 42 is reciprocal transversely to the slideways. Preferably, the slideways 36 and 38 are arranged with or parallel to the slideway 38. The upper slideway 36 contains a stack of the protective containers 22 and the lower slideway 38 contains a stack of the circuit units 20 which slide by gravity to the insertion station 40.

The pusher 42 extends through a guide plate 44 which supports and slidably guides the pusher, the guide plate being rigidly mounted on the upright mounting plate 34. Carried by the pusher 42 there is a cam follower 46 which rides on a cam 48 affixed onto a driven shaft 50. The cam 48 is driven by an electric motor 52 through a suitable speed reduction mechanism 54 to reciprocate the pusher 42. A coil spring 55 yieldingly holds the cam follower 46 against the cam 48.

The pusher 42 has an abutment end or upwardly facing surface 56 which in the down or retracted position of the pusher 42 aligns with the upper surface of the lower slideway 38 and forms part of the insertion station 40. Also, the insertion station 40 is defined by a stop member 58 and an anvil 60. The stop member 58, in the form of an upright plate, defines the lower end of the lower slideway 38 and also functions to guide the pusher 42. The anvil 60 overlies the upper slideway 36 directly above the abutment surface 56 of the pusher 42. It will now be understood that on the upward or insertion stroke of the pusher 42 the circuit unit 20 at the insertion station 40 is moved upwardly and inserted into the container 22 above, the latter being backed by the anvil 60. As shown in FIGS. 6 and 7, the bottom of the upper slideway 36 is provided with a clearance opening 62 to allow for the passing of a circuit unit 20 up through the upper slideway during the insertion stroke of the pusher 42.

Figure 3:
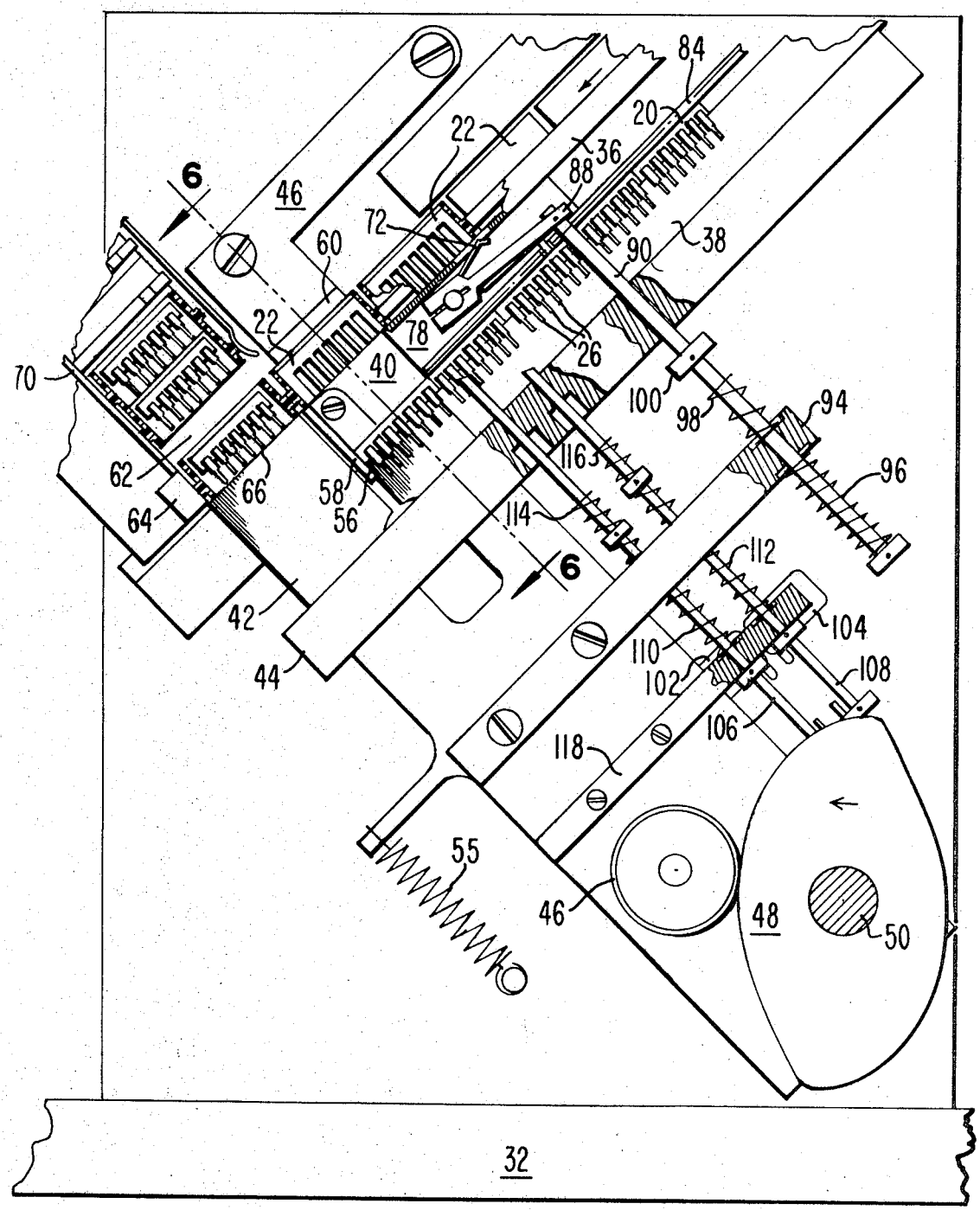
FIG. 3 is an enlarged fragmentary side view of the apparatus of FIG. 1.
Figure 4:
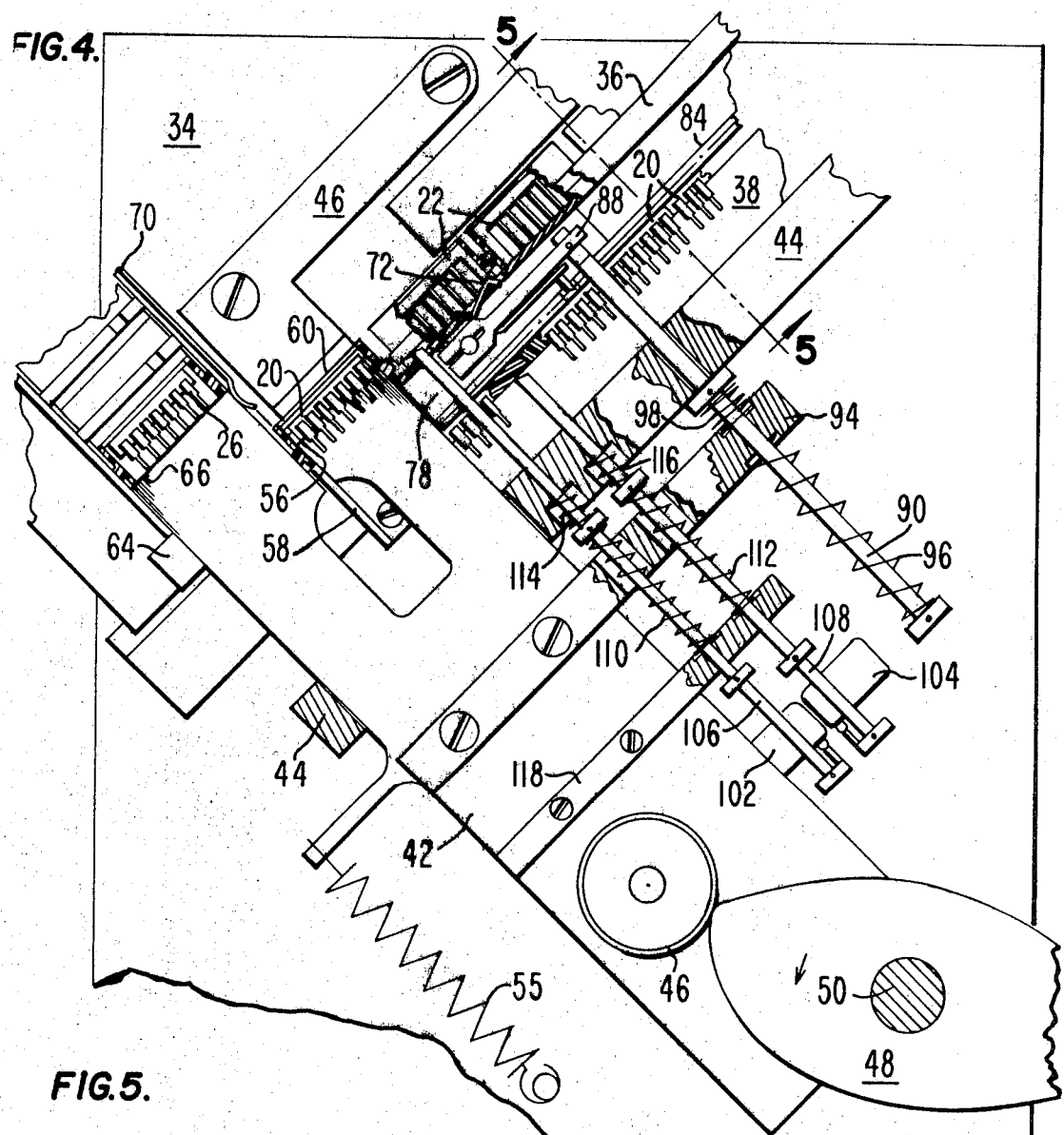
FIG. 4 is an enlarged fragmentary side view similar to FIG. 3.

Adjacent to and on the other side of the stop member 58 from the insertion station 40, the upper slideway 36 is provided with an ejection station 62 defined by stop member 64 and a second upwardly facing abutment surface 66 on the pusher 42. The abutment surface 66 is in stepped relation to the abutment surface 56 such that when the pusher 42 is at the bottom of its stroke the abutment surface 66 will be in alignment or flush with the upper surface of the slideway 36, as shown for example, in FIG. 3. Mounted on the mounting plate 34 there is an elongated container or magazine 70 having a lower open end in alignment with the ejection station 62 where the ejected assemblies are loaded into the magazine by the action of the pusher 42.

In order to allow for free sliding of the stacks of circuit units 20 and containers 22 down their respective slideways and yet assure against their displacement and resulting jams by the weights of the stacks, there is provided an upper stack weight restrainer 72 and a lower stack weight restrainer 74. As is best shown in FIGS. 8 and 9, the stack restrainers 72 and 74 are disposed between the slideways 36 and 38 and are affixed onto a rotatable horizontal shaft 76 which is journaled in a block 78, rigidly affixed to the mounting plate 34. The upper restrainer 72 is a sheet metal arm having a slightly angled free end 80 to provide a slight cam action against an adjacent one of the containers 22. The arm 72 is arranged to engage the container 22 at the junction formed by the lower edge and inner surface of the trailing end wall of the container, as illustrated in FIG. 8. The lower stack weight restrainer 74 is a friction holder which is carried by the free end of a sheet metal arm 82 which is affixed to the shaft 76. The lower restrainer 74 extends through the top of a guard rail 84 which overlies the stack of circuit units 20. In FIG. 8, the upper restrainer 72 is restraining the weight of the stack on the containers 22 at the insertion and ejection stations 40 and 62 and the lower restrainer 74 is retracted.

Affixed onto the outer end of the shaft 76 there is a rocker arm 88 to which the upper end of a connecting rod 90 is pivotally connected. The rod 90 extends downwardly through a guide hole in the plate 44 and through a hole in an arm 94 which is carried by and rigidly connected to the pusher 42. Surrounding the rod 90 below the arm 94 there is a coil spring 96 which provides a yielding connection between the pusher 42 and the lower stack weight restrainer when the latter engages one of the circuit units 20, as in FIG. 3. Also surrounding the rod 90 above the arm 94 there is a light spring 98. Above the spring 98 but below the plate 44 there is a flange or collar 100 which engages the plate 44 to limit clockwise rocking of the upper stack weight restrainer 72. The rod and spring 98 provide a lost-motion connection between the pusher 42 and the rocker arm 88 and thus between the pusher and the stack weight restrainers 72 and 74. This provides, during the insertion stroke of the pusher 42, for delay in retracting the lower stack weight restrainer 74 until the circuit unit 20 at the insertion station 40 has been pushed completely out of the lower stack or clear of the adjacent unit. When the circuit unit being inserted clears the lower stack of units, the stack weight restrainer 74 is pivoted to release the stack so that the latter then moves down. Just before the pusher 42 pushes the circuit unit into the container, the cam-like end 80 of the restrainer 72 engages the rear edge of the adjacent container and takes the stack weight off of the container at the insertion station 40 and also takes the weight off the previously assembled container and circuit unit at the ejection station 62. On the retraction stroke of the pusher 42, the lost-motion connection effects a delay in the retraction of the upper stack weight restrainer 72 until after the assembled unit has been ejected from the ejection station 62.

In order to avoid jamming of the operation in the event that one or the other of the slideways 36 and 38 is allowed to become depleted of parts, there is provided a pair of control members or limit switches 102 and 104. These switches 102 and 104 are connected in circuit with the motor 52 and respond respectively to an indication of approaching depletion of parts in the slideways 36 and 38. To this end, the switches 102 and 104 are provided with rod-like actuators 106 and 108 respectively which are yieldingly connected to the pusher 42 by lower coil springs 110 and 112 and upper coil springs 114 and 116. The rods 106 and 108 extend through and are guided by an arm 118 which is carried by the pusher 42. On each insertion stroke of the pusher 42, the rods 106 and 108 move upwardly and if one or the other is not stopped by the presence of a circuit unit 20 or a container 22, as the case may be, the corresponding one of the switches 102, 104 is opened which stops the motor 52.

In FIG. 12 there is shown a modification having parts like those previously described, designated by primed reference characters. In the apparatus of FIG. 1 to 11, lowermost one of the integrated circuit units is aligned at the insertion station 40 by engagement of the body 24 of the unit with a stop plate 58. In the modification of FIG. 12, alignment is achieved by the provision of a pair of abutment faces 120 positioned for engagement respectively by the opposite ones of the lowermost pair of leads 26. As shown, the abutment faces 120 are angularly disposed such that they diverge in the direction counter to the direction of descent of the stack of circuit units 20. This type of alignment is considered preferable to the stop plate 58 since in the use of the latter, variations in the sizes of the bodies 24 could cause a jam in the assembly operation.

What is claimed is:

1. Apparatus for handling and inserting integrated circuit units respectively into protective containers comprising an upper inclined slideway for a stack of containers, a lower inclined slideway for a stack of integrated circuit units, an anvil having an abutment surface overlying a lower portion of said upper slideway, first stop means to stop a container beneath said abutment surface, second stop means at the lower end of said lower slideway to stop the lowermost one of said stack of circuit units in alignment with the container beneath said anvil abutment surface, and a reciprocal pusher at the lower end of said lower slideway and movable toward and away from said abutment surface to insert the lowermost one of said circuit units upwardly into the container beneath said abutment surface.

2. Apparatus as defined by claim 1 with the addition of a restraining member movable with said pusher and to a position to temporarily remove the weight of at least a portion of the stack of circuit units from the lowermost unit during the retracting stroke of said pusher.

3. Apparatus as defined by claim 2 with the addition of a delayed action member operatively connected to said restrainer member to release the stock of circuit units after said pusher removes the lowermost circuit unit from the stack.

4. Apparatus as defined by claim 3 wherein said delayed action member is a resilient connector operatively connecting said restrainer member to said pusher.

5. Apparatus as defined by claim 1 with the addition of a restrainer member disposed along said second slideway, said restrainer member movable with said pusher and to a position to temporarily remove the weight of at least a portion of the stack of containers from the lowermost container during the insertion stroke of said pusher and prior to the insertion of a circuit unit into a container.

6. Apparatus as defined by claim 1 with the addition of a first restrainer member disposed along said lower slideway and operable with the retraction and insertion strokes of said pusher to respectively alternately restrain and release at least a portion of the stack of circuit units, and a second restrainer member disposed along said upper slideway and operable with the insertion and retraction strokes of said pusher to respectively alternately release and restrain at least a portion of the stack of containers.

7. Apparatus as defined by claim 1 with the addition of control means responsive to the absence of a circuit unit at a predetermined point along said lower slideway and operatively connected to said pusher to discontinue operation of the latter.

8. Apparatus as defined by claim 1 with the addition of control means responsive to the absence of a protective container at a predetermined point along said upper slideway to discontinue operation of said pusher.

9. Apparatus as defined by claim 6 wherein said first and second restrainer members operate together and between said slideways.

References Cited
UNITED STATES PATENTS

| 2,955,393 | 10/1960 | Muller et al. | 53—242X |
| 3,435,586 | 4/1969 | Scherr | 53—242 |

TRAVIS S. McGEHEE, Primary Examiner

U.S. Cl. X.R.

53—242, 252

UNITED STATES PATENT OFFICE
CERTIFICATE OF CORRECTION

Patent No. 3,557,522            Dated January 26, 1971

Inventor(s)     Jakob Rech

It is certified that error appears in the above-identified patent and that said Letters Patent are hereby corrected as shown below:

Column 2, line 34, after "with" insert -- the slideway 36 directly above and laterally positioned with --. Column 4, line 51, "the stock" should read -- the stack --.

Signed and sealed this 8th day of June 1971.

(SEAL)
Attest:

EDWARD M. FLETCHER, JR.           WILLIAM E. SCHUYLER, JR
Attesting Officer                  Commissioner of Patents

FORM PO-1050 (10-69)